(12) United States Patent
Rothman et al.

(10) Patent No.: US 7,231,512 B2
(45) Date of Patent: Jun. 12, 2007

(54) TECHNIQUE FOR RECONSTITUTING A PRE-BOOT FIRMWARE ENVIRONMENT AFTER LAUNCH OF AN OPERATING SYSTEM

(75) Inventors: Michael A. Rothman, Gig Harbor, WA (US); Vincent J. Zimmer, Federal Way, WA (US); David K. Dorwin, Puyallup, WA (US)

(73) Assignee: Intel Corporation, Santa Clara, CA (US)

(*) Notice: Subject to any disclaimer, the term of this patent is extended or adjusted under 35 U.S.C. 154(b) by 536 days.

(21) Appl. No.: 10/324,263

(22) Filed: Dec. 18, 2002

(65) Prior Publication Data

US 2004/0123086 A1 Jun. 24, 2004

(51) Int. Cl.
*G06F 15/177* (2006.01)

(52) U.S. Cl. .............................. 713/1; 713/2; 713/100

(58) Field of Classification Search .................... 713/1, 713/2, 100
See application file for complete search history.

(56) References Cited

U.S. PATENT DOCUMENTS

| | | | | |
|---|---|---|---|---|
| 5,918,048 A | * | 6/1999 | Mealey et al. ................. | 713/2 |
| 5,944,821 A | * | 8/1999 | Angelo .......................... | 726/22 |
| 5,974,547 A | * | 10/1999 | Klimenko ....................... | 713/2 |
| 5,991,822 A | * | 11/1999 | Mealey et al. .............. | 719/327 |
| 6,128,732 A | * | 10/2000 | Chaiken ........................ | 713/2 |
| 6,219,828 B1 | * | 4/2001 | Lee ............................. | 717/129 |
| 6,253,320 B1 | * | 6/2001 | Sekiguchi et al. ............. | 713/2 |
| 6,615,288 B1 | * | 9/2003 | Herzi ........................... | 710/10 |
| 6,745,296 B2 | * | 6/2004 | Chong .......................... | 711/138 |
| 6,775,734 B2 | * | 8/2004 | Chang ............................ | 711/2 |
| 6,857,041 B2 | * | 2/2005 | LeClerg ....................... | 711/103 |
| 6,889,340 B1 | * | 5/2005 | Bramley, Jr. .................. | 714/6 |
| 2001/0016892 A1 | * | 8/2001 | Klein .......................... | 710/260 |
| 2003/0093579 A1 | * | 5/2003 | Zimmer et al. ............. | 709/318 |
| 2004/0034764 A1 | * | 2/2004 | Bulusu et al. ................. | 713/1 |

* cited by examiner

*Primary Examiner*—Thomas Lee
*Assistant Examiner*—Vincent Tran
(74) *Attorney, Agent, or Firm*—Racheol Wu

(57) ABSTRACT

A technique in accordance with the invention includes in response to an asynchronous interrupt occurring during a run time of an operating system, executing instructions. These instructions are associated with firmware that is used to initialize a computer system before launching of the operating system.

25 Claims, 6 Drawing Sheets

TECHNIQUE FOR RECONSTITUTING A PRE-BOOT FIRMWARE ENVIRONMENT AFTER LAUNCH OF AN OPERATING SYSTEM

BACKGROUND

The invention generally relates to a technique for reconstituting a pre-boot firmware environment after launch of an operating system.

A conventional computer system typically enters a boot services mode when the system is powered up. In this boot services mode, the system executes firmware instructions that are stored in a non-volatile, firmware memory of the system. The execution of this firmware permits the computer system to perform basic input and output firmware services that allow the system to initialize system memory, detect system devices, perform a self-test, display a status update to a user, etc. At the conclusion of the boot services mode, the computer system launches an operating system.

After the launch of the operating system, only a limited subset of the firmware services are available though the use of software interrupts (associated with an "INT" instruction) or a callable interface (such as extensible firmware interface (EFI) runtime services). These services may include, for example, services to read and write to a hard disk drive, a service to display information on a monitor, etc. These software interrupts are synchronized to the system clock of the computer system and thus, are "synchronous interrupts".

In a typical computer system, none of the firmware services mentioned above are available to service asynchronous interrupts. Instead, these interrupts may be serviced by a system management mode (SMM) of the computer system. The purpose of the SMM is to handles certain functions (power management functions, for example) that are hidden from the operating system and applications of the computer system. SMM program code typically is stored in a region of system memory called a system management random access memory (SMRAM). The size of the SMRAM typically is limited. Therefore, due to this size constraint, the SMM typically is a lightweight handler that does some basic state initialization and exits back to the operating system with no other work.

Thus, there is a continuing need for better ways to service interrupts in a computer system.

DETAILED DESCRIPTION

An embodiment of a technique in accordance with the invention allows boot services mode firmware to be executed on a computer system during a run time mode of an operating system, without affecting the operating system. More specifically, in some embodiments of the invention, this firmware may be executed during a system management mode (SMM) of the computer system, thereby expanding the functions that may be performed during the SMM. To accomplish this, the techniques described herein use the boot services mode of the computer system to establish a mechanism to permit later use of boot services mode firmware when the operating system is in its run time mode. Furthermore, the techniques that are described herein may be used after the operating system run time. In this manner, the techniques that are described herein may be used in the event of an operating system crash (as an example) to perform some corrective action or restart the computer system.

In the context of this application, "boot services mode" refers to a mode of the computer system at startup, or powerup, of the system before the launch of the operating system. In this manner, in the boot services mode, the computer system performs such functions as initializing system memory, performing a self test, detecting installed devices, detecting buses, loading the operating system, etc. At the conclusion of the boot services mode, the operating system is launched. The boot services mode is to be contrasted to the "run time mode" of the computer system, the mode of the computer system after the launch of the operating system in which the operating system generally controls the computer system. It is noted that the computer system may enter a system management mode (SMM) during the run time mode, and the SMM is generally transparent to the operating system and to any applications that are currently being executed on the computer system.

Figure 1:
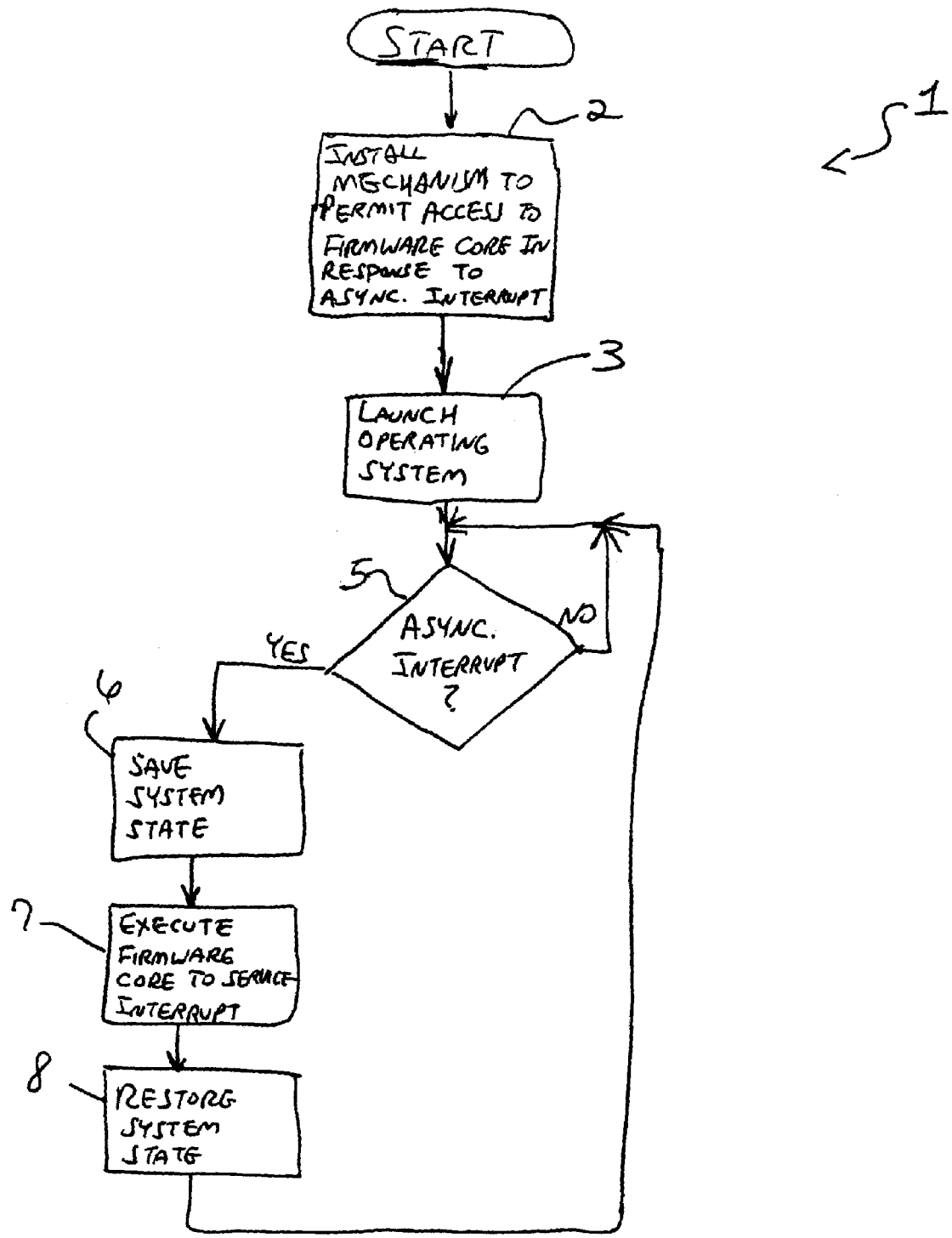
FIG. 1 is a flow diagram depicting a technique to service an asynchronous interrupt according to an embodiment of the invention.

Referring to FIG. 1, as a more specific example, in some embodiments of the invention, a technique 1 in accordance with the invention includes installing (block 2) a mechanism to permit access to a firmware core in response to an asynchronous interrupt. In some embodiments of the invention, this firmware core includes all or at least part of the same firmware that is executed for purposes of establishing the boot services mode of the computer system.

In some embodiments of the invention, the firmware core may include all or part of a basic input output system (BIOS) (legacy PC/AT BIOS instructions, for example) that is executed by the computer system in the boot services mode for purposes of initializing the computer system, such as initializing system memory, detecting devices that are installed on the computer system, performing a self-test of the computer system, displaying status data on a display of the computer system, accessing a hard drive, etc. A limited subset of BIOS routines may be accessed via software interrupts (i.e., synchronized interrupts) during the run time mode of the computer system. It is noted that the BIOS code typically is developed by a sole vendor, and thus, challenges may exist in updating the BIOS code with changes and/or additional functions without replacing all of the BIOS code or updating the BIOS code with an update from this sole vendor.

In other embodiments of the invention, as an alternative to BIOS, the firmware may include, in some embodiments of the invention, an extensible firmware interface (EFI). The EFI represents various application program interfaces (APIs) that may be provided by one or more vendors for purposes of establishing the various functions that are performed during the boot services mode of the computer system.

Regardless of the type of firmware, the firmware core refers to all or at least part of the firmware that is executed during the boot services mode of the computer system. It is noted that during this boot services mode, some of the firmware may be executed directly from a firmware (i.e., non-volatile) memory; and some of the firmware may be copied (or "shadowed") to system memory (after initialization of the system memory) during the boot services mode and executed from the system memory. This shadowed memory may have been dynamically created and/or modified. All or part of the firmware core may come from firmware memory, and in some embodiments of the invention, all or part of the firmware core may come from Firmware Volumes (FVs) that are stored on other types of media such as a hard disk, a network, etc.

It is noted that in some embodiments of the invention, the techniques described herein may be used to perform services that are not available in the boot services mode. Thus, the firmware core may include, for example, firmware related to services that are not available in the boot services mode.

Still referring to FIG. 1, in accordance with the technique 1, after installing (block 2) the mechanism to permit access to the firmware core, the technique 1 includes launching the operating system, as depicted in block 3. As a more specific example, this may include loading an operating system loader into the system memory and thereafter executing the loader for purposes of launching the operating system.

At the launch of the operating system, the computer system transitions into a run time mode. During this mode, a determination is made whether an asynchronous interrupt (a processor management interrupt (PMI) on the Itanium system architecture or a system management interrupt (SMI) on the x86/IA32 system architecture, as examples) has occurred, as depicted in diamond 5. The source of this asynchronous interrupt is, as its name implies, not synchronized to the system clock signal. As an example, the asynchronous interrupt may be generated in response to an out-of-band network channel, a signal from another computer system, a specific network packet, etc.

Conventionally, when in a system management mode (SMM), a typical computer system executes program code that is stored in the system management random access memory (SMRAM). The size of the SMRAM typically is limited, thereby limiting the capabilities that may be achieved by executing the conventional SMM code.

However, in accordance with the invention, due to the installation of the mechanism (block 2), the firmware core is available to perform a variety of functions that are typically associated with the boot services mode of the computer system. Thus, in accordance with the invention, the technique 1 includes upon the occurrence of the asynchronous interrupt, saving (block 6) the system state and executing (block 7) the firmware core to service the asynchronous interrupt. This servicing of the asynchronous interrupt via the execution of the firmware core provides a framework from which a wide variety of functions that are available during the boot services mode of the computer system may be performed in the system management mode. After the execution of the firmware core to service the asynchronous interrupt, the technique 1 in accordance with the invention includes restoring the system state, as depicted in block 8.

The technique 1 may be useful for purposes of permitting agents that are external to the computer system to temporarily control and communicate with the computer system without otherwise affecting operation of the computer system. Thus, due to the above-described technique 1, a mechanism is established to create an encapsulated firmware core and an associated infrastructure to allow for external agents to preemptively interrupt the computer system when the computer system is in the operating system run time mode to service an external request.

Figure 2:
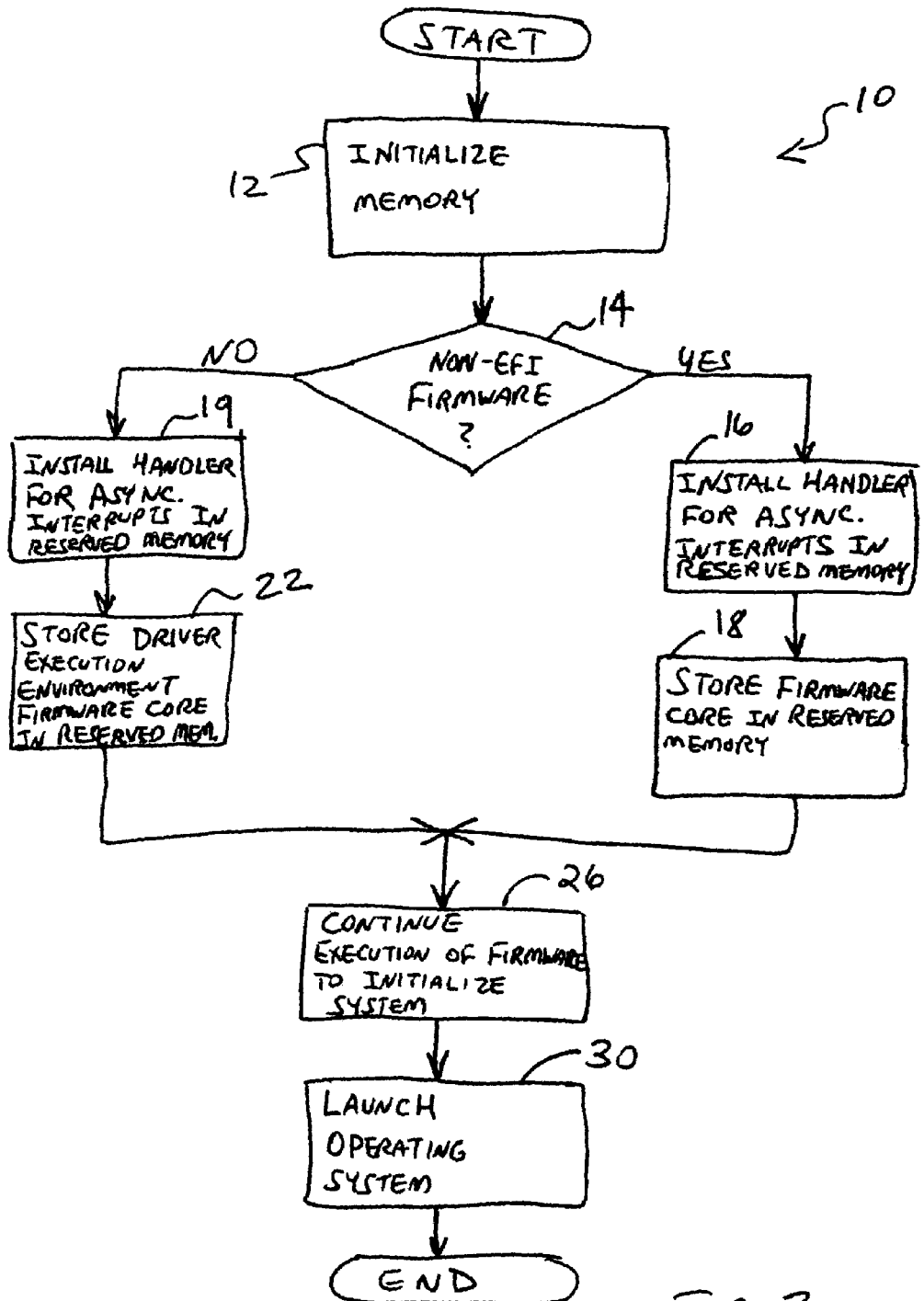
FIG. 2 is a flow diagram depicting a technique to establish a mechanism to permit access to a firmware core in response to an asynchronous interrupt according to an embodiment of the invention.

Referring to FIG. 2, in some embodiments of the invention, the computer system may perform a technique 10 for purposes of installing the mechanism that permits access to the firmware core during the operating system run time mode. As an example, the technique 10 typically is performed via the execution of firmware instructions during the boot services mode of the computer system. In the technique 10, the system memory of the computer system is initialized, as depicted in block 12. If the firmware that is executed during the boot services mode is non-EFI firmware (diamond 14), then the technique 10 includes installing a handler for asynchronous interrupts in reserved memory and storing the firmware core (all or at least part of this non-EFI firmware) in reserve memory, as depicted in blocks 16 and 18. If the firmware is EFI firmware, then the technique 10 includes installing a handler for asynchronous interrupts in a reserved memory area and storing a driver execution environment (DXE) firmware core in a reserve memory area, as depicted in blocks 19 and 22. The DXE firmware core forms all or at least part of the EFI firmware.

As a more specific example, in some embodiments of the invention, the interrupt handler that is registered for the asynchronous interrupts may be stored in a reserved system memory region, such as SMRAM; and the firmware core may be stored in a reserved system memory region other than SMRAM. Due to this technique, space inside the SMRAM is conserved for possibly other system management functions related to the system management mode.

Continuing with the description of the technique 10, in some embodiments of the invention, the technique 10 includes continuing (block 26) the execution of the firmware to initialize the system in the boot services mode. As an example, this continuance may include detecting additional devices (other than the system memory) of the computer system, performing tests on the computer system, etc. Subsequently, at the conclusion of the boot services mode, the technique 10 includes launching the operating system, as depicted in block 30.

Thus, the technique 10, in some embodiments of the invention, may be performed via the execution of firmware to establish the boot services mode of the computer system. In this boot services mode, the technique 10 establishes a mechanism from which a firmware core (all or at least part of the firmware used in the boot services mode) may be used to perform various functions when the computer system is in the SMM.

Figure 3:
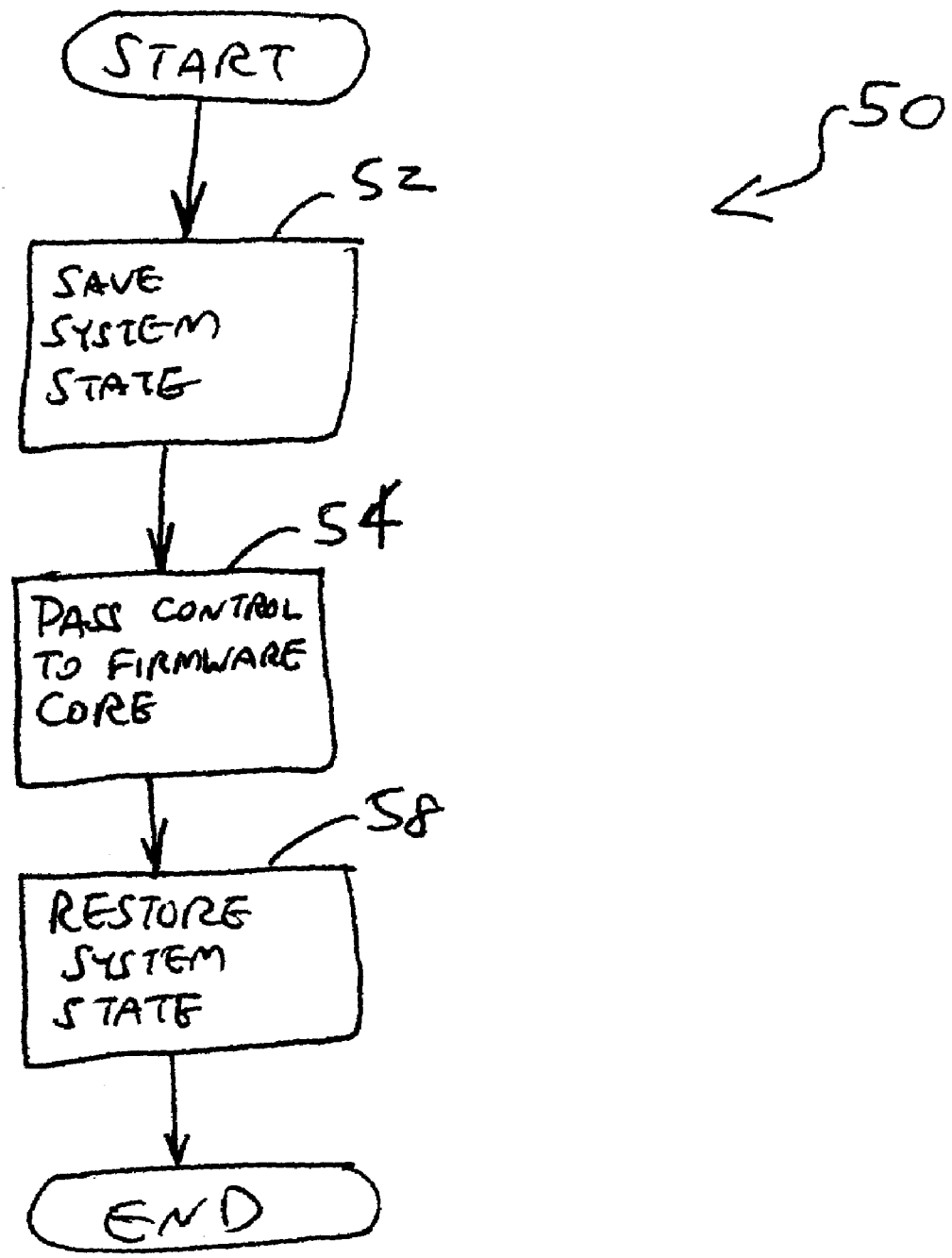
FIG. 3 is a flow diagram depicting a technique used by an interrupt handler according to an embodiment of the invention.

Referring to FIG. 3, in some embodiments of the invention, the execution of the above-described interrupt handler may cause a technique 50 to be preformed. Thus, the technique 50 is performed in response to an asynchronous interrupt. In this regard, the interrupt handler may be registered in the computer system to be called in response to the occurrence of an asynchronous interrupt.

In the technique 50, the system state is saved (block 52), and control is passed (block 54) to the firmware core. As a more specific example, to pass control to the firmware core, the firmware core is found and a jump is made to this firmware core that was placed in the reserved memory location. The interrupt handler passes the firmware core some data to indicate the particular operation(s) or function (s) that are being requested. It is the execution of this firmware core that reconstitutes the boot services environment so that the boot services routines (i.e., the firmware core) may be used to process remote queries such as dumping memory, performing local input/output, exporting system event logs, resetting the computer system, etc.

It is noted that this transfer of control to the execution of the firmware core may be accomplished both during the run time of the operating system as well as a mode of the computer system after the operating system (i.e., in the "afterlife" of the computer system). For example, the transfer of control may occur in response to a crash of the operating system or to a condition caused by the instability of the operating system. Thus, the execution of the firmware core may be used in the event of an operating system crash (as an example) to perform some corrective action or restart the computer system.

After the firmware core has completed its query, the firmware core relinquishes control back to the interrupt handler. Thus, once the interrupt handler detects an exit situation, the interrupt handler restores (block 58) the system state that may have been perturbed by the execution of the firmware core and an exit is made back to the operating system. It is noted that if a system reset request has occurred, the computer system reboots without returning control to the operating system.

Figure 4:
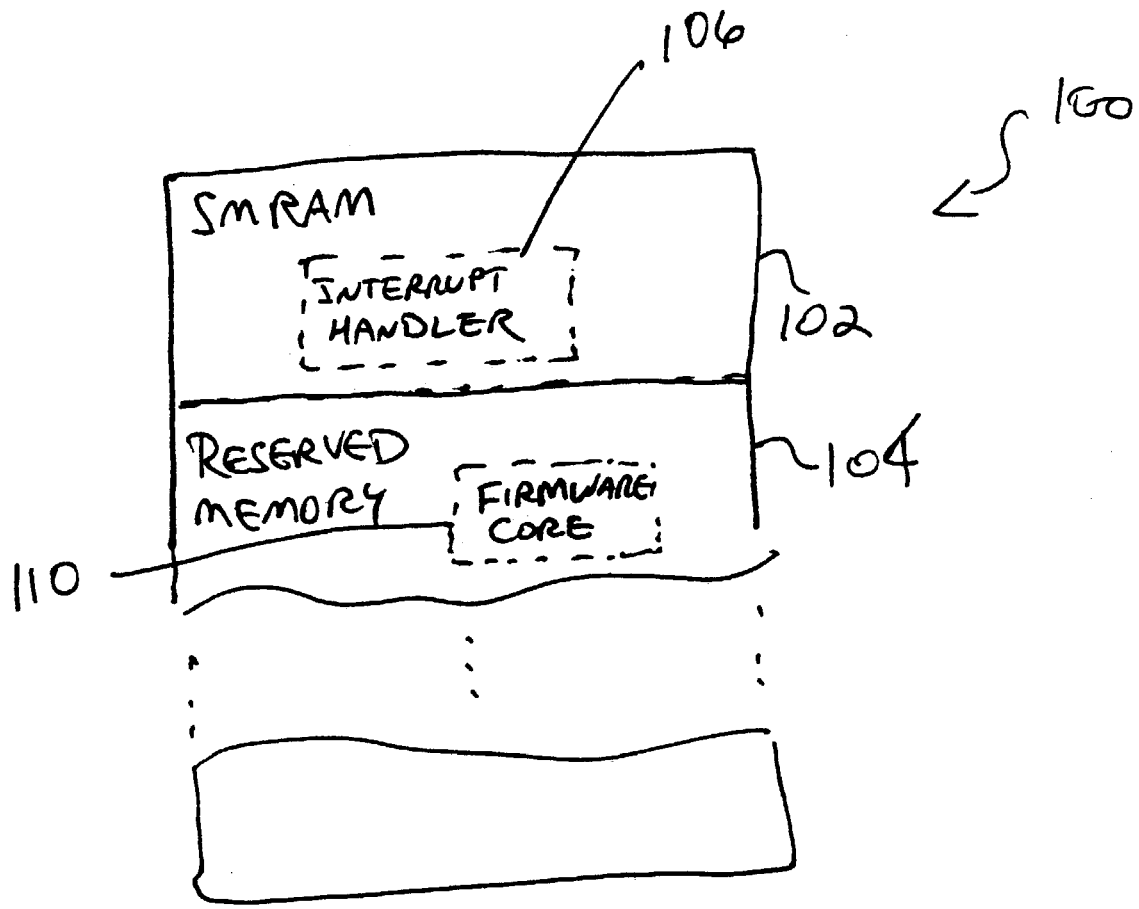
FIG. 4 is an illustration of a memory organization according to an embodiment of the invention.

FIG. 4 depicts an illustration 100 of a memory organization in accordance with the invention. As shown, the system memory 100 includes an SMRAM region 102 that is a reserved region of the system memory designated for SMRAM. In this region, in accordance with some embodiments of the invention, program code 106 for the above-described interrupt handler is stored. In a separate but reserved region 104 of the system memory 100, in accordance with the invention, a firmware core 110 is stored. As noted above, this firmware core 110 may include all or part of the firmware that is also used to establish one or more functions during the boot services mode of the computer system.

Figure 5:
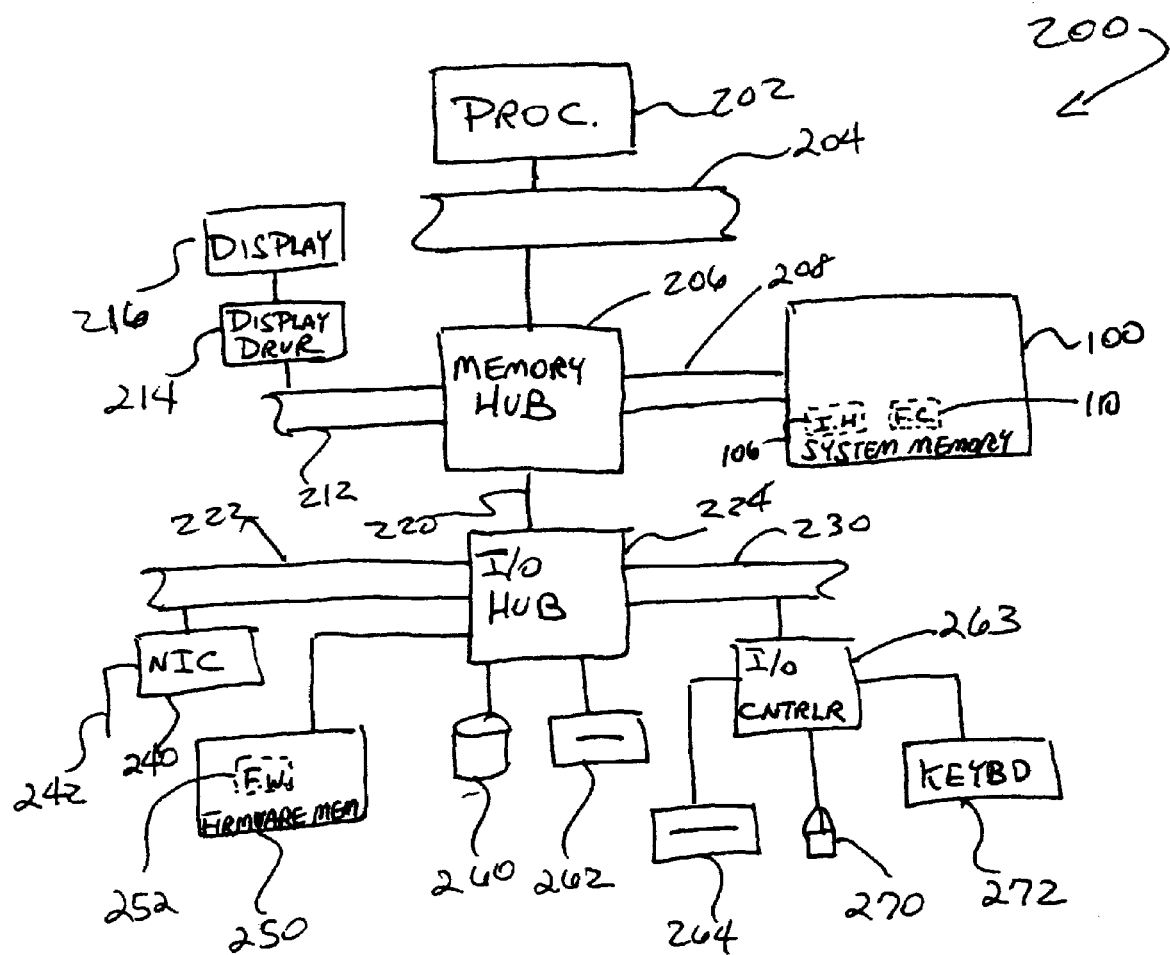
FIGS. 5 and 6 are schematic diagrams of computer systems according to embodiments of the invention.

Referring to FIG. 5, in some embodiments of the invention, the techniques described above may be used in connection with a computer system 200. In this manner, the computer system 200 may include a processor 202 that is coupled to a system bus 204. As an example, the processor 202 may include one ore more microprocessors (a Pentium microprocessor, for example). The computer system 200 also includes a north bridge, or memory hub 206, that establishes communication between the system bus 204, a memory bus 208 and an Accelerated Graphic Port (AGP) bus 212. The AGP is described in detail in the Accelerated Graphics Port Interface Specification, Revision 1.0, published on Jul. 31, 1996, by Intel Corporation of Santa Clara, Calif. The system memory 100, in turn, is coupled to the memory bus 208.

The computer system 200 may include a display driver 214 that is coupled to the AGP bus 212. The display driver 214 generates signals to drive a display 216 of the computer system 200. The memory hub 206, in some embodiments of the invention, communicates (via a hub 25 link 220) with a south bridge, or input/output (I/O) hub 224.

The I/O hub 224, in turn, establishes communications with an I/O expansion bus 230 and a Peripheral Component Interconnect (PCI) bus 222. The PCI Specification is available from The PCI Special Interest Group, Portland, Oreg. 97214.

In some embodiments of the invention, an I/O controller 263 may be coupled to the I/O expansion bus 230. The I/O controller 263 may receive input from a mouse 270 and a keyboard 272, as well as control operation of a floppy disk drive 264. The I/O hub 224 may also control operation of a hard disk drive 260 and a CD-ROM drive 262.

In some embodiments of the invention, a network interface card (NIC) 240 may be coupled to the PCI bus 222. In this manner, the NIC 240 may communicate via one or more communication lines 242 to a network, for example. This network may be, in some embodiments of the invention, a source for various asynchronous interrupts. In this manner, the computer system 200 may be controlled by another computer system and may be interrupted via packets received over the network connection.

The computer system 200 may include a firmware memory 250 (a flash memory, for example) that is coupled to the I/O hub 224 and stores firmware 252. The firmware 252 may form an DXE firmware core or a BIOS firmware core; and the firmware 252 may provide the instructions that are used to establish a boot services mode of the computer system 200 and to establish the firmware access mechanism that is described above.

Figure 6:
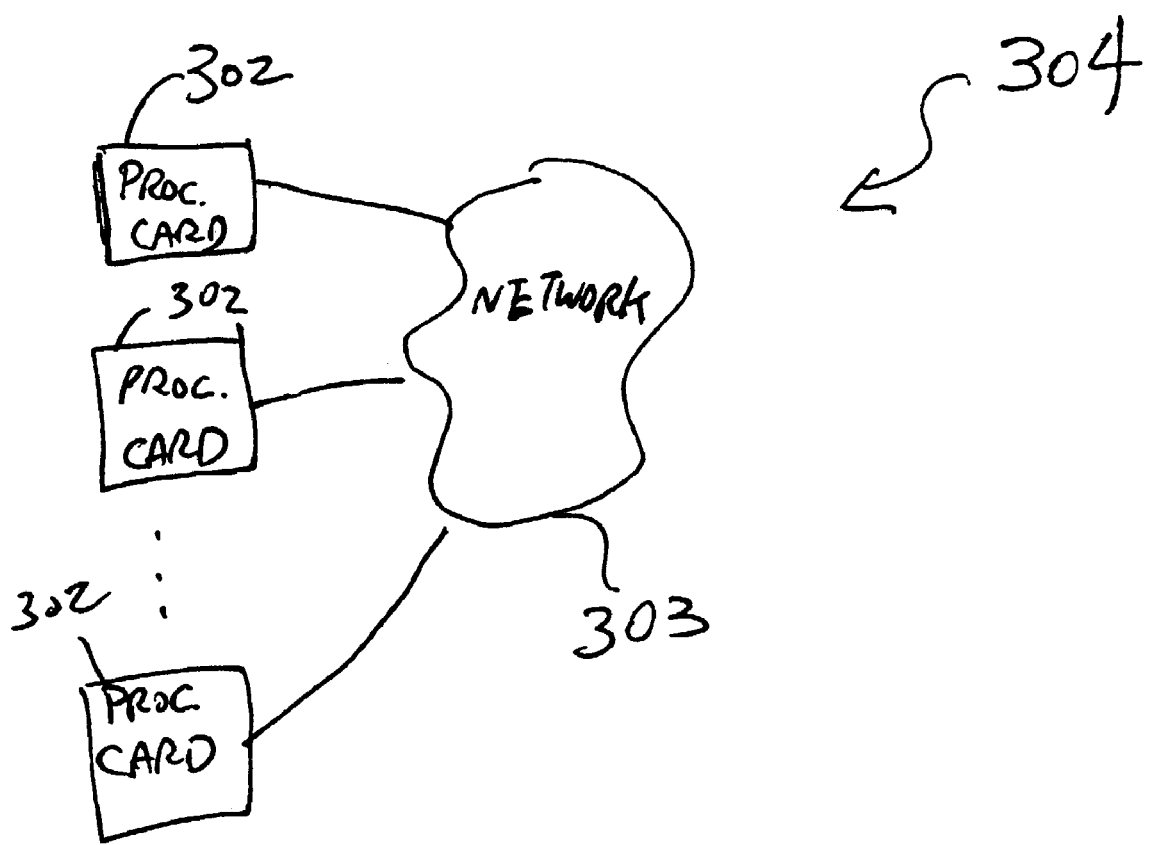

Referring to FIG. 6, in some embodiments of the invention, a system 304 may include various processor cards 302 that are coupled together via a network 303. As an example, each processor card 302 may include all or some of the components from the computer system 200. In this manner, one of the processor cards 302 may be a baseboard controller that controls the other processor cards 302 via the network 303. Thus, this baseboard controller may, for example, asynchronously interrupt one of the other processor cards 302 for purposes of obtaining information, rebooting a particular processor card 302 that has crashed, correcting an error in the execution of one of the processor cards 302, etc.

Other embodiments are within the scope of the following claims. For example, in some embodiments of the invention, the techniques described herein may be used to perform actions (in response to an asynchronous interrupt) that are not related to boot services mode firmware.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    copying firmware instructions that provide multiple services during initialization of a computer system to a memory region of the computer system before a run time of an operating system; and
    in response to an asynchronous interrupt occurring during the run time of the operating system, executing the firmware instructions of the memory region.

2. The method of claim 1, further comprising entering a system management mode of the computer system in response to the asynchronous interrupt.

3. The method of claim 1, further comprising:
    in response to the asynchronous interrupt, preserving a state of the operating system.

4. The method of claim 1, further comprising:
    restoring a state of the operating system in response to a termination of the executing.

5. The method of claim 1, wherein the asynchronous interrupt comprises at least one of the following:
    a processor management interrupt and a system management interrupt.

6. The method of claim 1, wherein the instructions comprise basic input output system instructions.

7. The method of claim 1, wherein the instructions comprise extensible firmware interface instructions.

8. The method of claim 1, wherein the instructions comprises legacy PC/AT BIOS instructions.

9. The method of claim 1, further comprising:
reselling the computer system in response to the execution of the instructions.

10. A method comprising:
copying firmware instructions that are used during initializing of a computer system to a first region of a system memory; and
providing a handler in a second region of the system memory to, in response to an asynchronous interrupt occurring during a run time of an operating system, transfer control to execution of the firmware instructions from the first region of the system memory.

11. The method of claim 10, wherein
providing comprises copying the handler from firmware to a system management memory region, and
copying comprises storing a copy of the firmware instructions outside of the system management memory region of the computer system prior to launching the operating system.

12. The method of claim 10, wherein prior to the copying, executing at least some of the firmware instructions to initialize the computer system.

13. The method of claim 10, wherein after the copying, executing at least some of the firmware instructions to initialize the computer system.

14. An article comprising a computer readable storage medium storing instructions to cause a processor to:
copy firmware that provides multiple services during initialization of a computer system to a memory of the computer system before launching of an operating system of the computer system; and
in response to an asynchronous interrupt occurring during a run time of the operating system, execute instructions of the firmware stored in the memory to perform the multiple services.

15. The article of claim 14, the storage medium storing instructions to cause the processor to enter a system management mode of the computer system in response to the asynchronous interrupt.

16. The article of claim 14, the storage medium storing instructions to cause the processor to:
in response to the asynchronous interrupt, preserving a state of the operating system.

17. The article of claim 14, the storage medium storing instructions to cause the processor to:
restore a state of the operating system in response to a termination of the execution of the instructions.

18. The article of claim 14, wherein the asynchronous interrupt comprises at least one of the following:
a processor management interrupt and a system management interrupt.

19. The article of claim 14, wherein the instructions comprise basic input output system instructions.

20. The article of claim 14, wherein the instructions comprise extensible firmware interface instructions.

21. The article of claim 14, the storage medium storing instructions to cause the processor to:
reset the computer system in response to the execution of the instructions.

22. A computer system comprising:
a processor; and
a memory having a first region to store first instructions associated with a firmware used to initialize the computer system before launching of the operating system and a second region to store second instructions to cause the processor to, in response to an asynchronous interrupt occurring during a run time of an operating system, execute the first instructions.

23. The computer system of claim 22, wherein the processor enters a system management mode of the computer system in response to the asynchronous interrupt.

24. The computer system of claim 22, wherein the first instructions comprise at least one of basic input output system instructions and extensible firmware interface instructions.

25. The computer system of claim 22, wherein the processor resets the computer system in response to the execution of the first instructions.

* * * * *